(12) United States Patent
Natsume (10) Patent No.: US 11,749,002 B2
(45) Date of Patent: Sep. 5, 2023

(54) LANE LINE RECOGNITION APPARATUS

(71) Applicant: SUBARU CORPORATION, Tokyo (JP)

(72) Inventor: Kensaku Natsume, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 17/493,385

(22) Filed: Oct. 4, 2021

(65) Prior Publication Data
US 2022/0108553 A1 Apr. 7, 2022

(30) Foreign Application Priority Data
Oct. 4, 2020 (JP) .................................. 2020-168136

(51) Int. Cl.
G06V 20/56 (2022.01)
G06V 10/88 (2022.01)
G06V 10/60 (2022.01)

(52) U.S. Cl.
CPC ............ G06V 20/588 (2022.01); G06V 10/60 (2022.01); G06V 10/88 (2022.01)

(58) Field of Classification Search
CPC ...... G06V 20/588; G06V 10/60; G06V 10/88; G06V 10/44
See application file for complete search history.

(56) References Cited

FOREIGN PATENT DOCUMENTS

| DE | 102013205950 A1 | * | 10/2013 | ......... G06K 9/00798 |
| JP | H0935197 A | * | 2/1997 | |
| JP | 2019-79470 A | | 5/2019 | |

OTHER PUBLICATIONS

Hu, Jianjun, Songsong Xiong, Yuqi Sun, Junlin Zha, and Chunyun Fu. "Research on lane detection based on global search of dynamic region of interest (DROI)." Applied Sciences 10, No. 7 (2020): 2543. (Year: 2020).*

* cited by examiner

*Primary Examiner* — Carol Wang
(74) *Attorney, Agent, or Firm* — TROUTMAN PEPPER HAMILTON SANDERS LLP (57) ABSTRACT

A lane line recognition apparatus includes an imaging device, a lane-line-search-region setting section, a light-streak-search-region setting section, a light-streak determination section, a light-streak-reaching determination section, and a mask processing section. The imaging device is to be mounted on a vehicle and captures an image of a traveling environment in front of the vehicle. The lane-line-search-region setting section sets a lane-line search region on the image. The light-streak-search-region setting section sets a light-streak search region adjacently to the lane-line search region. The light-streak determination section determines whether a light streak that crosses, in a vertical direction of the image, the light-streak search region is found. The light-streak-reaching determination section determines, if the light streak is found, whether the light streak reaches the lane-line search region. The mask processing section performs, if the light streak reaches the lane-line search region, a mask process on the light streak.

9 Claims, 8 Drawing Sheets

LANE LINE RECOGNITION APPARATUS

CROSS-REFERENCE TO RELATED APPLICATION

The present application claims priority from Japanese Patent Application No. 2020-168136 filed on Oct. 4, 2020, the entire contents of which are hereby incorporated by reference.

BACKGROUND

The technology relates to a lane line recognition apparatus that recognizes a lane line on the basis of an image captured by an imaging device mounted on an own vehicle.

A lane line recognition apparatus has been known that recognizes lane lines defining left and right of a lane on which an own vehicle is traveling and recognizes an outer lane line of a lane adjacent to the lane on which the own vehicle is traveling, on the basis of an image of the front of the own vehicle captured by an on-vehicle camera serving as an imaging device. The lane lines recognized by the lane line recognition apparatus are read in a driving assistance control apparatus. During active lane keep (ALK) control, steering control is performed in such a manner that the own vehicle travels in the middle of the lane between the left and right lane lines. During lane departure prevention (LDP) control, if the own vehicle is predicted to deviate from lane lines, a steering torque is applied in such a manner as to cause the own vehicle to travel along inside of the lane lines.

Thus, the recognition of the lane line is important in driving assistance control. For such a reason, various techniques of accurately recognizing the lane line have been proposed. For example, Japanese Unexamined Patent Application Publication No. 2019-79470 discloses a technique as described below.

First, a start point and an end point of a lane line are extracted from edge points. The edge points are each detected on the basis of luminance variation on a search line of a stereoscopic image. Thereafter, whether the start point and the end point of the lane line are actual edge points corresponding to the lane line is verified in accordance with a preset evaluation criterion, on the basis of: a luminance difference between an estimated lane-line section estimated on the basis of the extracted start point and the extracted end point of the lane line and a road surface other than the estimated lane-line section; and a length of a transition section where luminance varies between the estimated lane-line section and the road surface. If it is determined as a result of the evaluation that the lane line having the corresponding start point and end point is highly unlikely to exist, the start point and the end point of the relevant lane line are excluded.

SUMMARY

An aspect of the technology provides a lane line recognition apparatus including an imaging device, a lane-line-search-region setting section, a light-streak-search-region setting section, a light-streak determination section, a light-streak-reaching determination section, and a mask processing section. The imaging device is to be mounted on a vehicle and is configured to capture an image of a traveling environment in front of the vehicle. The lane-line-search-region setting section is configured to set a lane-line search region on the image captured by the imaging device. The lane-line search region is a region in which, on the basis of a lane line defining a lane and found on the basis of an image of a last frame, the lane line of a current frame is to be searched for. The light-streak-search-region setting section is configured to set a light-streak search region adjacently to the lane-line search region. The light-streak search region is a region in which a light streak that appears in the image captured by the imaging device is to be searched for. The light-streak determination section is configured to determine whether the light streak that crosses, in a vertical direction of the image, the light-streak search region set by the light-streak-search-region setting section is found. The light-streak-reaching determination section is configured to determine, in a case where the light-streak determination section determines that the light streak that crosses, in the vertical direction, the light-streak search region is found, whether the light streak reaches the lane-line search region set by the lane-line-search-region setting section. The mask processing section is configured to perform, in a case where the light-streak-reaching determination section determines that the light streak reaches the lane-line search region, a mask process on the light streak in a process of recognizing the lane line of the current frame on the basis of luminance variation in the lane-line search region set by the lane-line-search-region setting section.

An aspect of the technology provides a lane line recognition apparatus including an image sensor and circuitry. The image sensor is mounted on a vehicle and is configured to capture an image of a traveling environment in front of the vehicle. The circuitry is configured to set a lane-line search region on the image captured by the image sensor. The lane-line search region is a region in which, on the basis of a lane line defining a lane and found on the basis of an image of a last frame, the lane line of a current frame is to be searched for. The circuitry is configured to set a light-streak search region adjacently to the lane-line search region. The light-streak search region is a region in which a light streak that appears in the image captured by the image sensor is to be searched for. The circuitry is configured to determine whether the light streak that crosses, in a vertical direction of the image, the set light-streak search region is found. The circuitry is configured to determine, in a case where the light streak that crosses, in the vertical direction, the light-streak search region is determined as being found, whether the light streak reaches the set lane-line search region. The circuitry is configured to perform, in a case where the light streak is determined as reaching the lane-line search region, a mask process on the light streak in a process of recognizing the lane line of the current frame on the basis of luminance variation in the set lane-line search region.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In nighttime traveling on a wet road surface, for example, light such as a tail lamp of a preceding vehicle, a headlamp of an oncoming vehicle, or road lighting may be projected on a road surface, and the light reflected on the road surface may appear as a light streak in an image captured by an on-vehicle camera.

In a case where the light streak is superimposed between the lane line start point and the lane line end point described above, it is difficult to accurately determine, in accordance with the above-described evaluation criterion, whether the lane line start point and the lane line end point are the edge points corresponding to the actual lane line.

It is desirable to provide a lane line recognition apparatus that is able to appropriately generate a lane line by eliminating a light streak even in the case where the light streak appears in the image captured by the on-vehicle camera.

Figure 1:
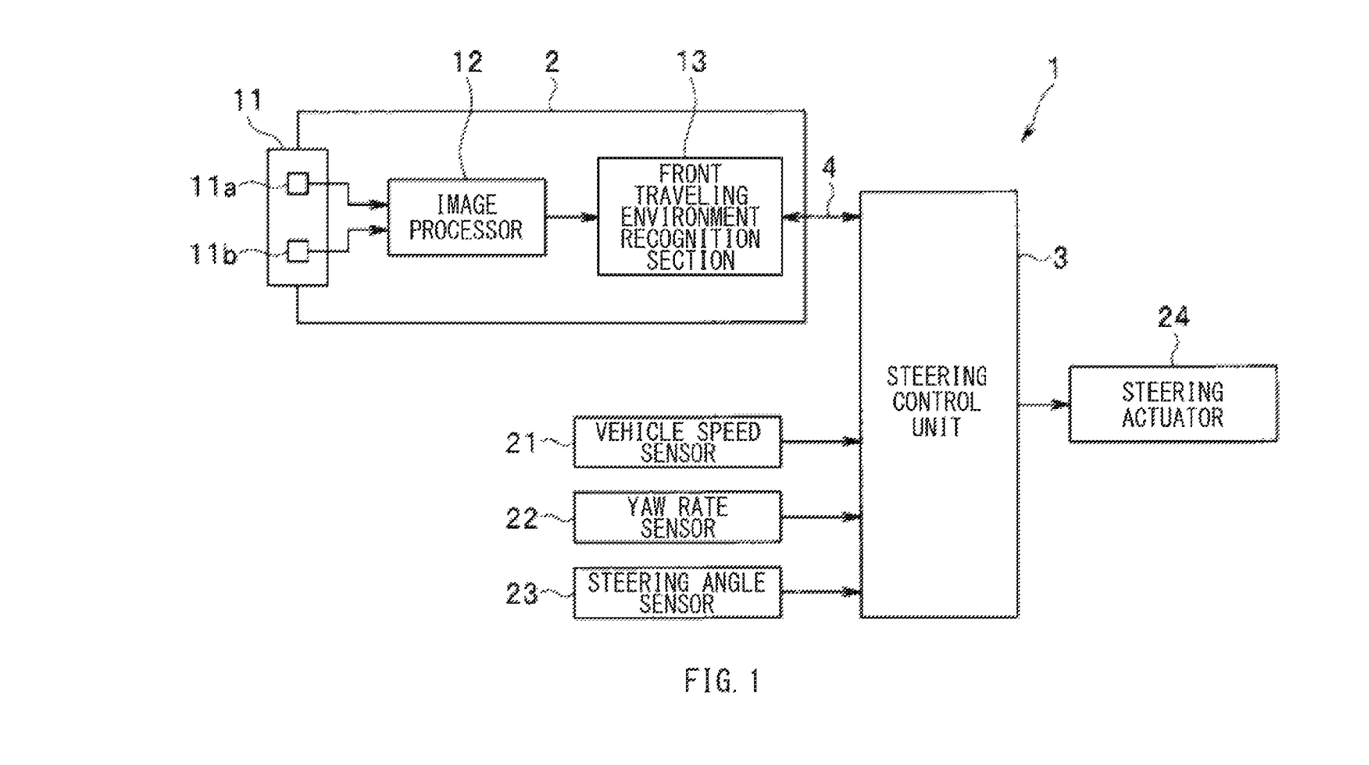
FIG. 1 is a block diagram illustrating a configuration of a driving assistance system according to one example embodiment of the technology.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. A driving assistance system 1 illustrated in FIG. 1 is mounted on an own vehicle M. The driving assistance system 1 may include a camera unit 2 and a steering control unit 3. The camera unit 2 and the steering control unit 3 may be coupled to each other in such a manner as to be able to perform bi-directional communication through an in-vehicle communication line 4 such as controller area network (CAN) communication. The steering control unit 3 and a front traveling environment recognition section 13, which will be described later, of the camera unit 2 may each include, without limitation: a microcomputer including a central processing unit (CPU), a random-access memory (RAM), and a read-only memory (ROM); and peripheral devices thereof. Stored in the ROM may be a control program, fixed data, and the like that are used to achieve an operation set for each system. In one embodiment, the front traveling environment recognition section 13 may serve as a "lane-line-search-region setting section", a "light-streak-search-region setting section", a "light-streak determination section", a "light-streak-reaching determination section", and a "mask processing section".

The camera unit 2 may include a camera section 11, an image processor 12, and the front traveling environment recognition section 13. In one embodiment, the camera section 11 may serve as an "imaging device". The camera section 11 may be a stereo camera including a main camera 11a and a sub-camera 11b. The main camera 11a and the sub-camera 11b may be disposed, for example, above a rear-view mirror at positions close to a windshield, and at equal intervals at a predetermined base length on the left and right from a midpoint in a vehicle widthwise direction. Further, the main camera 11a and the sub-camera 11b may each include an image sensor such as a charge coupled device (CCD) image sensor or a complementary metal oxide semiconductor (CMOS). An image of a traveling environment in front of the own vehicle M including a traveling lane of the own vehicle M may be captured by the main camera 11a and the sub-camera 11b. In the camera section 11, the main camera 11a may capture a reference image, and the sub-camera 11b may capture a comparative image.

A pair of analog images captured by the main camera 11a and the sub-camera 11b may be subjected to a predetermined image process by the image processor 12, and may thereafter be outputted to the front traveling environment recognition section 13. The front traveling environment recognition section 13 may perform, for example, various image processes to be described below on the basis of reference image data and comparative image data from the image processor 12.

First, the front traveling environment recognition section 13 may sequentially extract small regions each having, for example, 4×4 pixels, from the reference image. The front traveling environment recognition section 13 may compare luminance or a color pattern of each small region with the comparative image to find a region corresponding to the small region, thereby determining distance distribution over an entire reference image. In addition, the front traveling environment recognition section 13 may determine a luminance difference between adjacent pixels for each pixel of the reference image, may extract a pixel whose luminance difference exceeds a threshold as an edge point, and may assign distance information to the extracted pixel i.e., the edge point, thereby generating a distance image. The distance image is an image of distribution of the edge points each including the distance information.

Thereafter, the front traveling environment recognition section 13 may perform a known grouping process on the generated distance image and may compare the distance image having been subjected to the grouping process with a three-dimensional frame (window) stored in advance, thereby recognizing, for example: lane lines that define left and right of a lane along which the own vehicle M travels, i.e., own-vehicle traveling lane; a lane line on an outer side of a lane adjacent to the own-vehicle traveling lane, i.e., an adjacent lane; a side wall; and a three-dimensional object.

A lane line to be recognized in the example embodiment is a generic term for a lane marker that extends on a road and defines the own-vehicle traveling lane, such as a single lane line or a multiple line (e.g., double line) in which a sight-line guidance line, for example, is provided, along the lane line inside the own-vehicle traveling lane. Each lane line may be in a form of, for example, a solid line or a broken line, and may also be in a form of, for example, a yellow line. Further, in a case where lane lines actually existing on the road are each a double lane line, for example, lane line recognition of the example embodiment may be performed in such a manner that each of the left and right lane lines is recognized by being approximated by a single approximate expression (straight line or curved line approximate expression of first order or more).

Thereafter, the front traveling environment recognition section 13 may output the generated data related to the lane line, etc., to the steering control unit 3. The steering control unit 3 may assist steering of the own vehicle M on the basis of the data related to the lane line, etc., received from the front traveling environment recognition section 13. Coupled to an input terminal of the front traveling environment recognition section 13 may be various sensors and switches that detect various parameters desirable in performing steering control. The various sensors and switches may include, for example, a vehicle speed sensor 21 that detects a vehicle speed (own-vehicle speed) of the own vehicle M, a yaw rate sensor 22 that detects a yaw rate acting on the own vehicle M, and a steering angle sensor 23 that detects a steering angle of steering.

An output terminal of the steering control unit 3 may be coupled to a steering actuator 24. The steering actuator 24 may cause a steering wheel to operate in a predetermined steering angle in accordance with a control signal from the steering control unit 3. It is to be noted that power steering by an electric motor or a hydraulic motor is known as the steering actuator 24.

The steering control unit 3 may execute control related to various types of steering such as active lane keep (ALK) control or lane departure prevention (LDP) control on the basis of lane lines generated by the front traveling environment recognition section 13 of the camera unit 2. The ALK control may include recognizing left and right lane lines of the lane along which the own vehicle M travels and performing steering control in such a manner that the own vehicle M travels in the middle between the left and right lane lines. The LDP control may include determining a lateral position of the own vehicle M with respect to the left and right lane lines of the lane along which the own vehicle M travels and, in a case where it is predicted that the lateral position crosses the lane lines, preventing lane deviation by performing steering control in such a manner that the own vehicle M becomes parallel with the lane lines.

Figure 2:
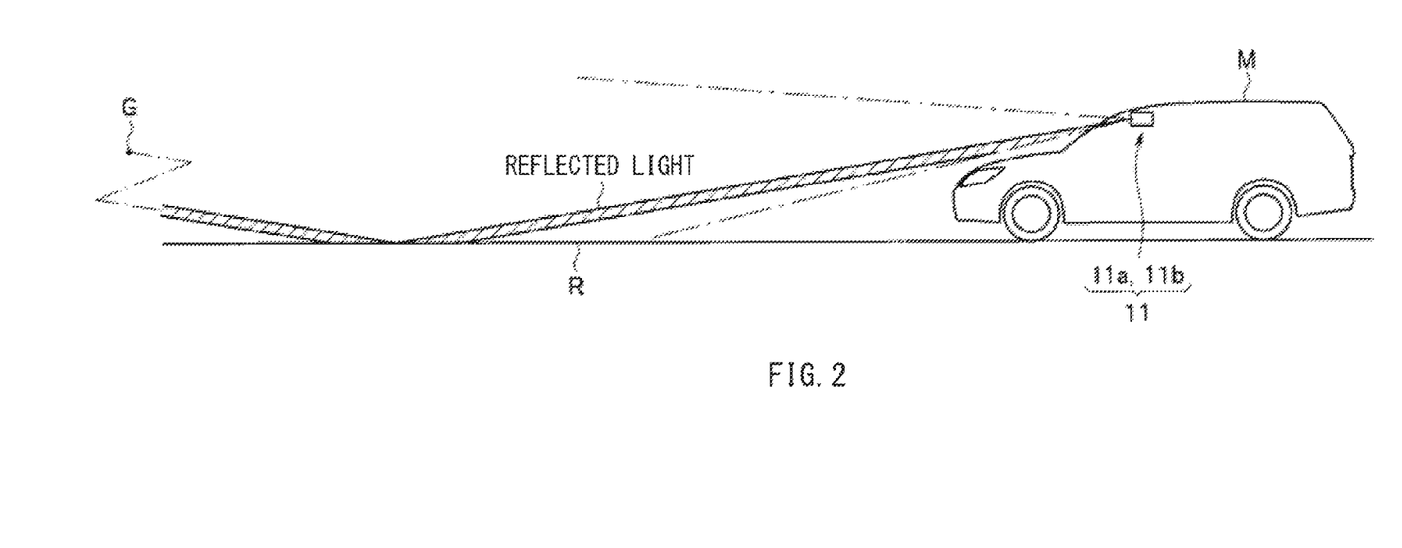
FIG. 2 is a side view of a state in which light reflected on a road surface enters a camera section.
Figure 3:
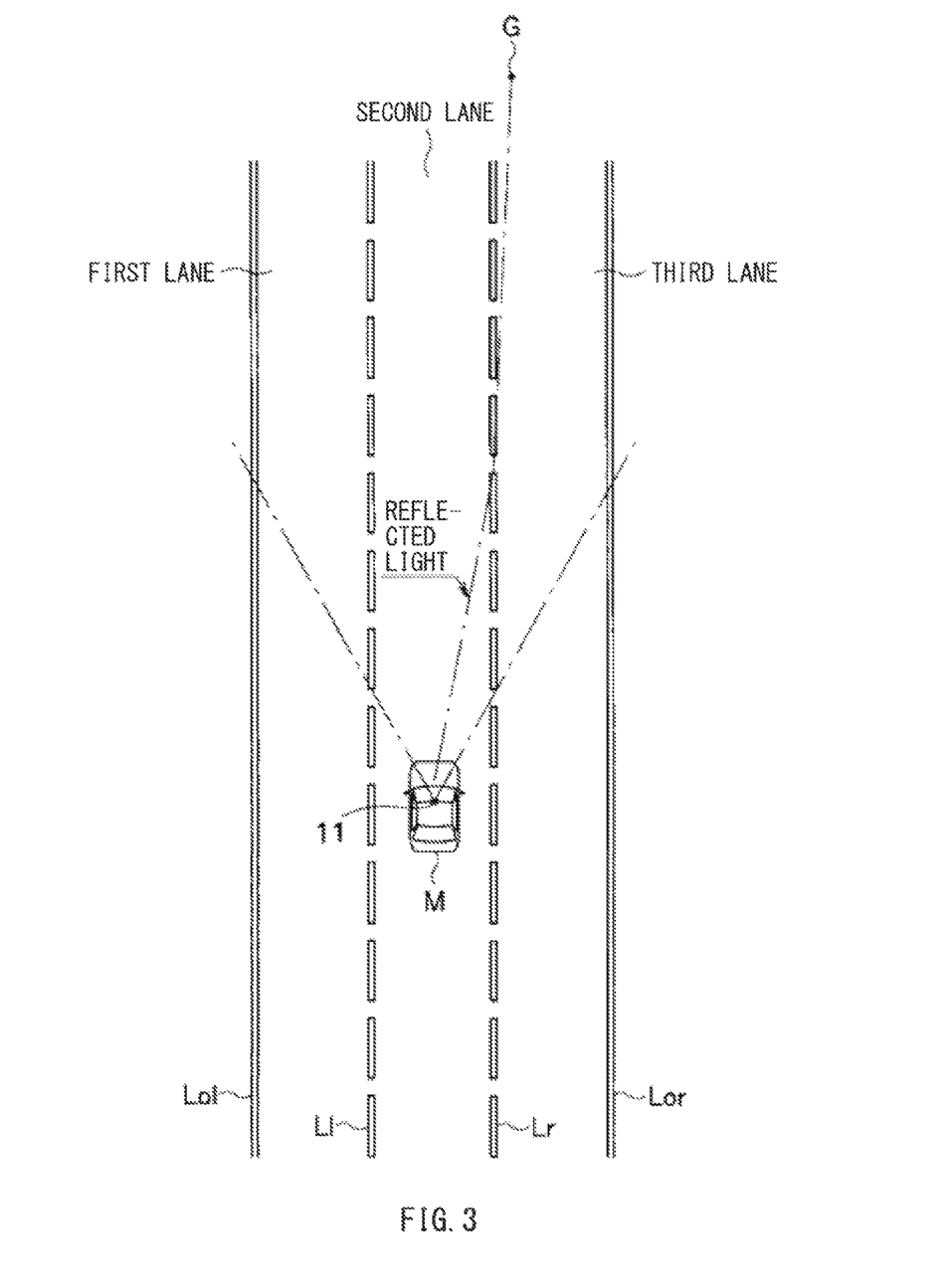
FIG. 3 is a bird's-eye view of the state in which the light reflected on the road surface enters the camera section.

As illustrated in FIGS. 2 and 3, there may be a case, for example, where light emitted from a light source G, such as a brake lamp or a blinking turn signal lamp of a preceding vehicle or a parallel-traveling vehicle, a streetlamp, or in-tunnel illumination, is projected on a road surface R in nighttime traveling in a state where the road surface R is wet, and where reflected light enters each of the main camera 11a and the sub-camera 11b as a noise component. In addition, there may be a case where light emitted from a headlamp of the own vehicle M is reflected on, for example, a delineator, a sign, or a pylon, and the reflected light enters each of the main camera 11a and the sub-camera 11b as the noise component. Moreover, there may be a case where light reflected from, for example, characters painted on the road surface or light projected on the windshield enters each of the main camera 11a and the sub-camera 11b as the noise component.

Figure 6:
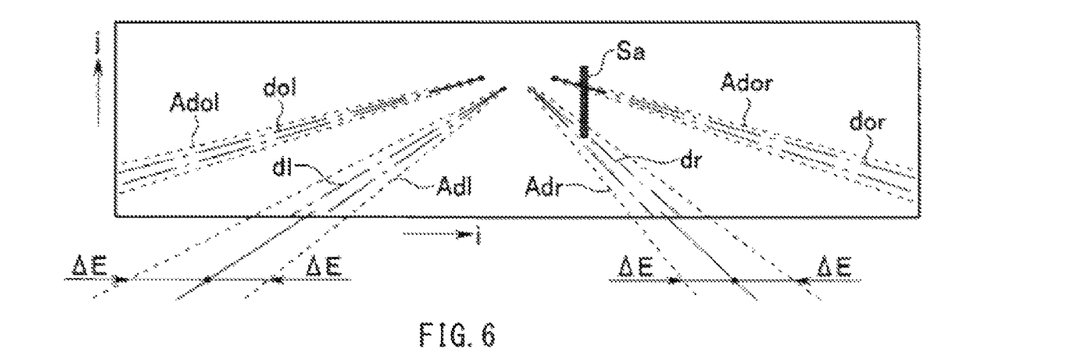
FIG. 6 is an explanatory diagram illustrating a mode of setting a lane line region on the basis of the lane line estimated in FIG. 5.

In such cases, as illustrated in FIG. 6, the light including the noise component that has entered at least one of the main camera 11a or the sub-camera 11b may appear in the image as a light streak Sa, which is a vertical streak, that extends in a vertical direction. As illustrated in FIG. 6, if the light streak Sa appearing in the image is superimposed on the vicinity of the lane line, the front traveling environment recognition section 13 can erroneously recognize the light streak Sa as the lane line.

Accordingly, in a case where the above-described front traveling environment recognition section 13 detects such a light streak Sa including the noise component, the front traveling environment recognition section 13 may mask a region of the light streak Sa and may set a lane-line-search prohibition region, thereby eliminating the light streak Sa which includes the noise component to generate the lane line with high accuracy.

Figure 4:
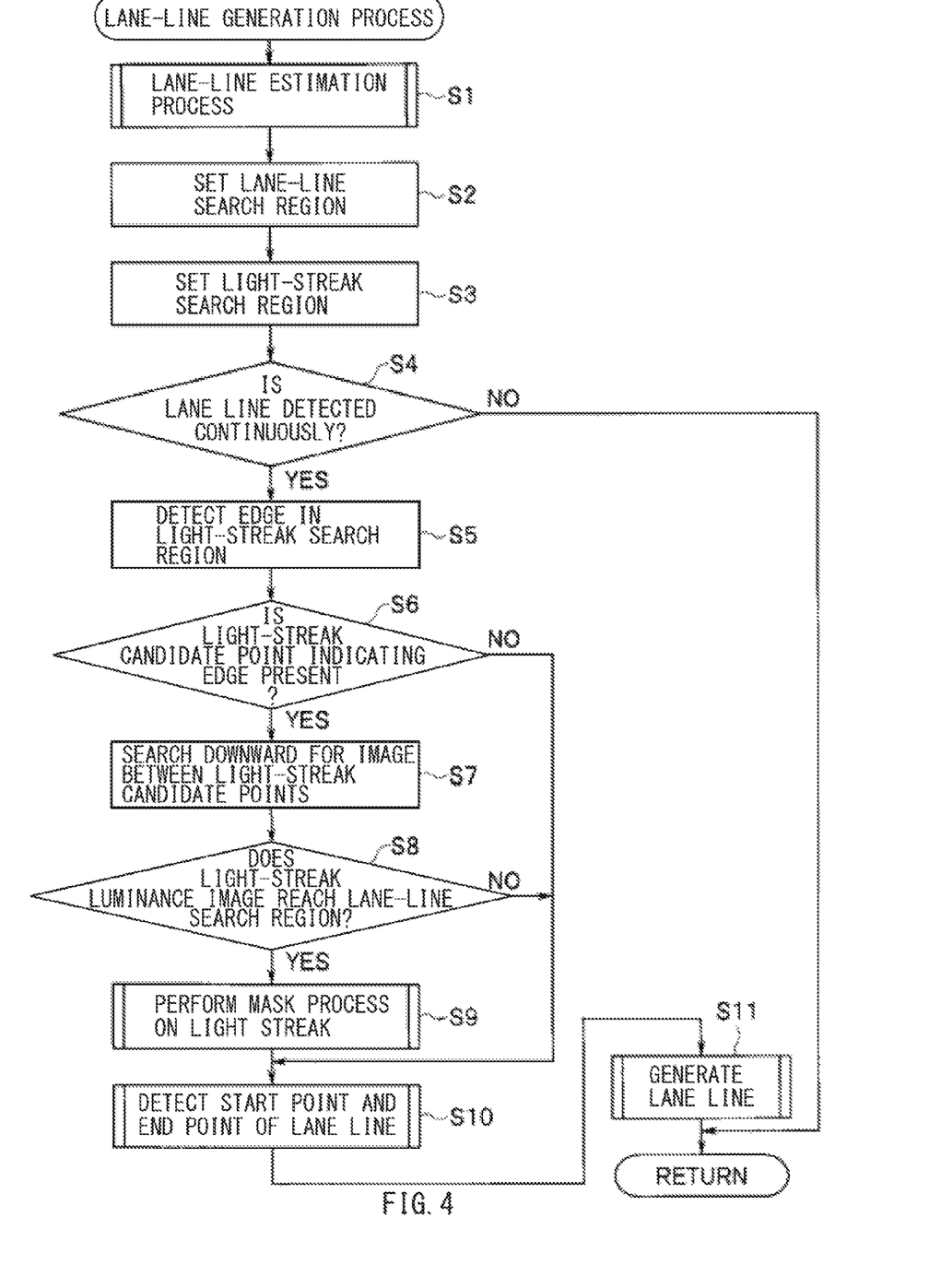
FIG. 4 is a flowchart illustrating a routine of a lane-line generation process.

In one example, a process of generating a lane line to be executed by the front traveling environment recognition section 13 may be performed in accordance with a routine of a lane-line generation process illustrated in FIG. 4. The routine may be executed for each frame of the image to be captured by the camera section 11. In the example embodiment, a case of a three-lane road will be described as an example. In this case, the lanes are referred to as "first lane", "second lane", and "third lane" in this order from the left lane for the sake of convenience. It is also assumed that the own vehicle M is traveling along the second lane.

Further, as illustrated in FIG. 3, the camera unit 2 according to the example embodiment may have a viewing angle and a resolution that make it possible to recognize an outer lane line Lol of the first lane adjacent to the second lane and an outer lane line Lor of the third lane adjacent to the second lane, as well as lane lines Ll and Lr of the second lane in a case where the own vehicle M is traveling along the second lane. In the following description, in a case where there is no need to distinguish the lane lines Ll, Lr, Lol, and Lor from each other, they are each collectively referred to as "L". Reference signs "i" and "j" in FIGS. 5 to 13 to be described below indicate the number of horizontal pixels and the number of vertical pixels, respectively.

Figure 5:
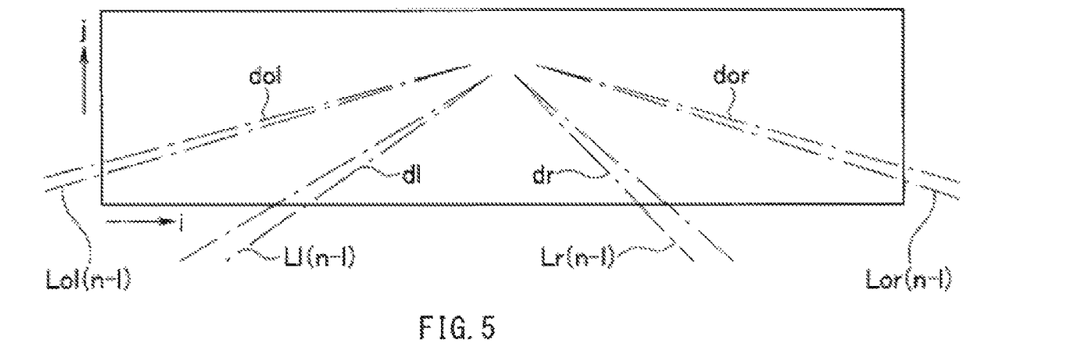
FIG. 5 is an explanatory diagram illustrating a mode of estimating a position of a lane line on the basis of a captured image.

First, in step S1, as illustrated in FIG. 5, the front traveling environment recognition section 13 may set estimated lane lines dl, dr, dol, and dor on an image of a current frame by taking into consideration a yaw rate detected by the yaw rate sensor 22 to each of lane lines Ll(n−1), Lr(n−1), Lol(n−1), and Lor(n−1), on the basis of the lane lines Ll(n−1), Lr(n−1), Lol(n−1), and Lor(n−1). Hereinafter, the estimated lane lines dl, dr, dol, and dor are collectively referred to as "d" in a case where there is no need to distinguish them from each other. The lane lines Ll(n−1) and Lr(n−1) respectively define the left and right of the second lane and are recognized in an image of a last frame, and the lane lines Lol(n−1) and Lor(n−1) respectively define an outer side of the first lane and an outer side of the third lane and are recognized in the image of the last frame.

In step S2, the front traveling environment recognition section 13 sets lane-line search regions Adl, Adr, Adol, and Ador to the estimated lane lines dl, dr, dol, and dor, respectively. Hereinafter, the lane-line search regions Adl, Adr, Adol, and Ador are collectively referred to as "Ad" in a case where there is no need to distinguish them from each other. The process in step S2 may correspond to a process performed by the "lane-line-search-region setting section" of one embodiment of the technology.

Referring now to FIG. 6, a method of setting the lane-line search region Ad will be described. First, the front traveling environment recognition section 13 may determine a center of a line width of each estimated lane line d. Thereafter, the front traveling environment recognition section 13 may identify a search region by causing the center to be offset by a preset offset width ΔE in width directions of the line width of the estimated lane line d. In FIG. 6, only estimated lane lines dl and dr are each marked with a symbol of the offset width ΔE; however, the lane-line search regions Adol and Ador may also be similarly set for the estimated lane lines dol and dor.

Thereafter, the front traveling environment recognition section 13 may convert the identified search region into coordinates on the reference image, and may set each lane-line search region Ad. In the following, in order to facilitate the explanation, an image of original lane lines displayed on the image is omitted in FIGS. 7 to 9 and 13.

Figure 7:
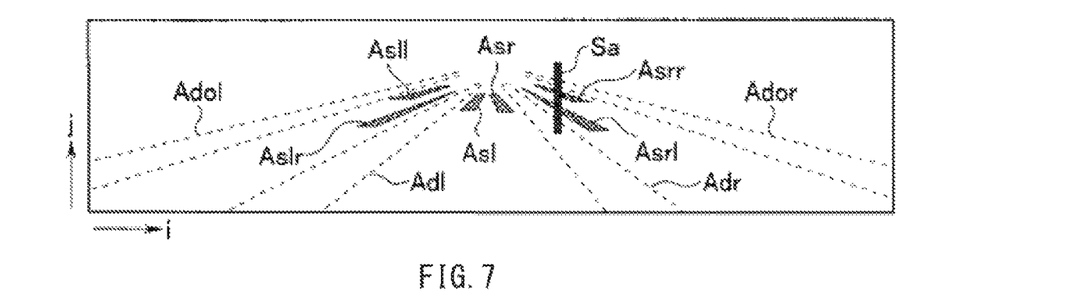
FIG. 7 is an explanatory diagram illustrating a mode of setting a light-streak search region in the lane line region set in FIG. 6.

The process may be caused to proceed to step S3, and, as illustrated in FIG. 7, the front traveling environment recognition section 13 sets light-streak search regions Asl, Asr, Asll, Aslr, Asrl, and Asrr adjacently to the lane-line search regions Ad. Hereinafter, the light-streak search regions Asl, Asr, Asll, Aslr, Asrl, and Asrr are collectively referred to as "As" in a case where there is no need to distinguish them from each other. Thereafter, the process may be caused to proceed to step S4.

Each light-streak search region As may be set in at least a front region that affects steering control, upon performing the steering control of the own vehicle M on the basis of the lane line which is generated on the basis of the image captured by the camera unit 2. In other words, the light-streak search region As may be set in a distance range in which lane line information desirable in performing the steering control is acquirable. The process in step S3 may correspond to a process performed by the "light-streak-search-region setting section" of one embodiment of the technology.

In step S4, the front traveling environment recognition section 13 may determine whether generation of the lane line continues stably from several previous frames on the basis of a generation status of the lane line in a previous frame stored in a temporary storage such as the RAM. If the front traveling environment recognition section 13 determines that the generation of the lane line continues stably (S4: YES), the process may be caused to proceed to step S5. If the front traveling environment recognition section 13 determines that the generation of the lane line is intermittent and unstable (S4: NO), the process may exit the routine. In the first place, a state where the generation of the lane line is unstable makes it not possible to perform driving assistance control including the steering control, and moreover, makes setting of a lane-line search position or the light-streak search region As unstable; thus, the front traveling environment recognition section 13 does not search for the light streak.

Figure 8:
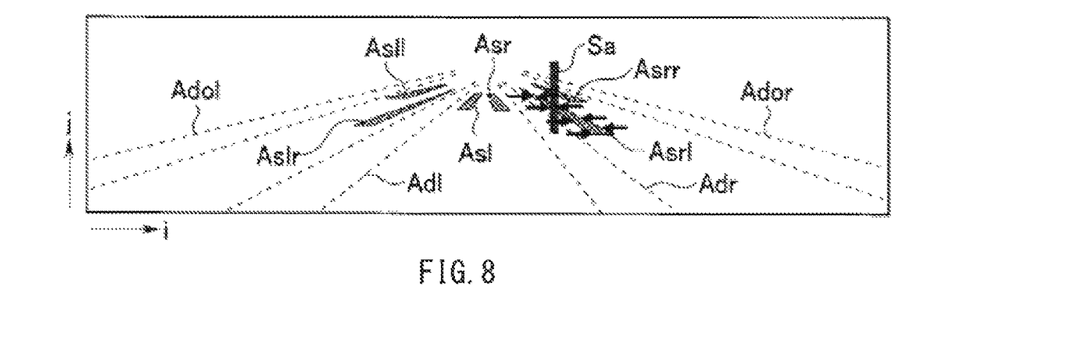
FIG. 8 is an explanatory diagram illustrating a mode of detecting an edge of the light-streak search region set in FIG. 7.

In step S5, the front traveling environment recognition section 13 may start detection of an edge of the light streak Sa in each light-streak search region As. In detecting the edge of the light streak Sa, first, the front traveling environment recognition section 13 may determine luminance variation from the bottom to the top for each search line including a plurality of pixel rows extending in a horizontal direction, in each light-streak search region As set on the reference image. FIG. 8 representatively illustrates a mode of searching the light-streak search region Asrl in a direction indicated by arrows.

No lane line should be detected in any light-streak search region As that is set parallel to the lane-line search region Ad. In contrast, the light streak Sa is a vertical streak, and therefore crosses any of the light-streak search regions As.

Figure 13:
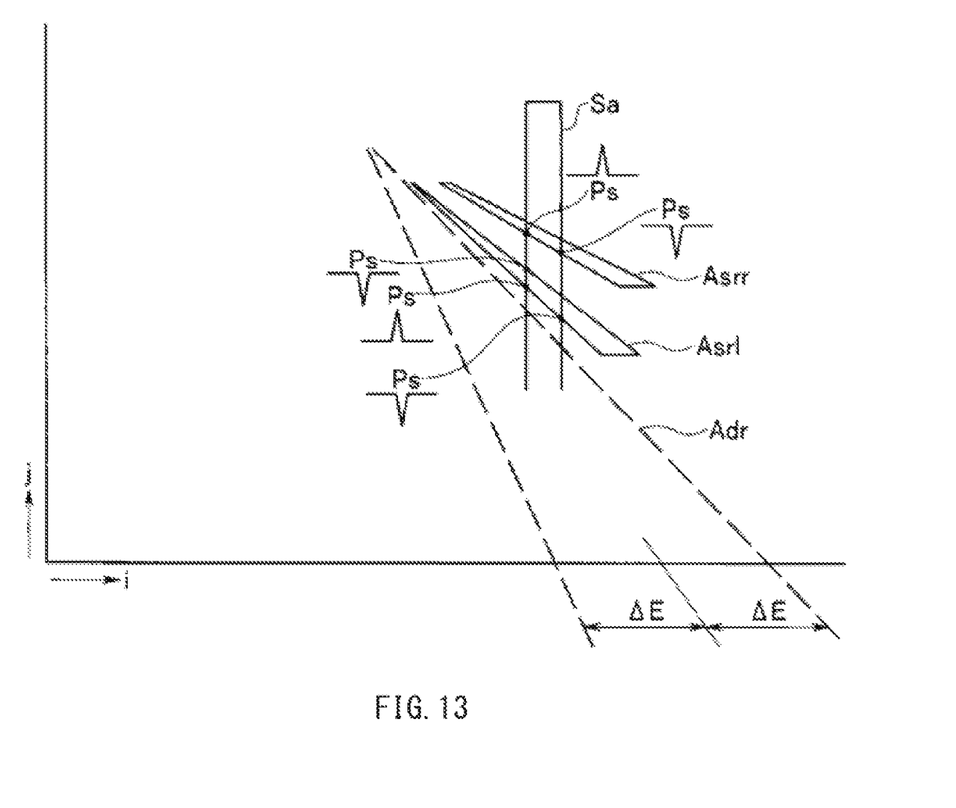
FIG. 13 is an explanatory diagram illustrating a mode of plotting light-streak candidate points in the light-streak search region that is set on the basis of the captured image.

In other words, as illustrated in FIG. 13, the light streak Sa may cross, in the vertical direction, the light-streak search regions Asrl and Asrr set in the third lane, for example, in a case where the own vehicle M is traveling along the second lane and where the light streak Sa is superimposed on the lane-line search region Adr set on the right side of the second lane.

The luminance variation in this case may include a negative threshold and a positive threshold. The negative threshold is used to detect a fall change that is a change from bright to dark in the light-streak search regions Asrl and Asrr. The positive threshold is used to detect a change a rise change which is a change from dark to bright in the light-streak search regions Asrl and Asrr. The front traveling environment recognition section 13 may search for changes in edges using the negative and positive thresholds.

The front traveling environment recognition section 13 may plot edges that have been found as light-streak candidate points Ps on the coordinate system, and may cause the process to proceed to step S6. In the drawing, an amount of luminance variation of the pixel is indicated by a differential value.

In step S6, the front traveling environment recognition section 13 determines whether the light-streak candidate point Ps indicating the edge is detected in any one of the light-streak search regions As. If the front traveling environment recognition section 13 determines that the light-streak candidate point Ps is detected (S6: YES), the process may be caused to proceed to step S7. If the front traveling environment recognition section 13 determines that no light-streak candidate point Ps is detected in any of the light-streak search regions As (S6: NO), the process may be caused to jump to step S10. The processes in steps S5 and S6 may correspond to processes performed by the "light-streak determination section" of one embodiment of the technology.

Figure 9:
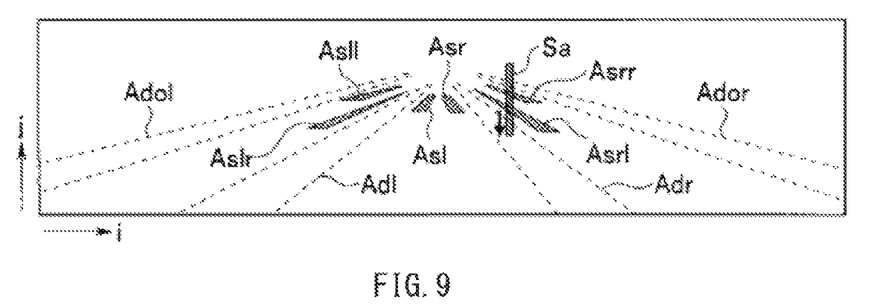
FIG. 9 is an explanatory diagram illustrating a mode of searching for a similar-luminance image in a case where the edge is detected in the light-streak search region in FIG. 8.

In step S7, the front traveling environment recognition section 13 may search for an image downward, i.e., in the vertical direction, as indicated by an arrow illustrated in FIG. 9. The image has luminance similar to luminance inside the width in the horizontal direction between the light-streak candidate points Ps. In step S8, the front traveling environment recognition section 13 determines whether a luminance image in which the light streak Sa is detected reaches the lane-line search region Ad. The processes in steps S7 and S8 may correspond to processes performed by the "light-streak-reaching determination section" of one embodiment of the technology.

Although the edge search is performed only in the light-streak search region As, the search of the luminance whose level is similar to the level of luminance at which the light streak Sa is detected may also be performed in a region other than the light-streak search region As, such as the lane-line search region Ad. In other words, the lane line extends substantially along the lane-line search region Ad, and thus, the luminance image appearing in the vertical direction into the lane-line search region Ad may be considered to be a noise, i.e., the light streak Sa.

If the front traveling environment recognition section 13 determines that the luminance image reaches the lane-line search region Ad (S8: YES), the process may be caused to proceed to step S9. If the front traveling environment recognition section 13 determines that the luminance image is cut before the lane-line search region Ad (S8: NO), the process may exit the routine. If the front traveling environment recognition section 13 determines that the luminance image in which the light streak Sa is detected is cut before entering the lane-line search region Ad, the front traveling environment recognition section 13 will not erroneously recognize the light streak Sa as the lane line upon performing lane line search to be described later, and may thus cause the process to jump to step S10 without performing a mask process.

The process in step S8 may be omitted. In other words, even if the light streak Sa is cut before entering the lane-line search region Ad and the mask process is performed on that region by step S9 to be described later, the region on which the mask process is performed does not overlap with the lane-line search region Ad, and as a result, the process in step S10 to be described later is not interfered with.

Figure 10:
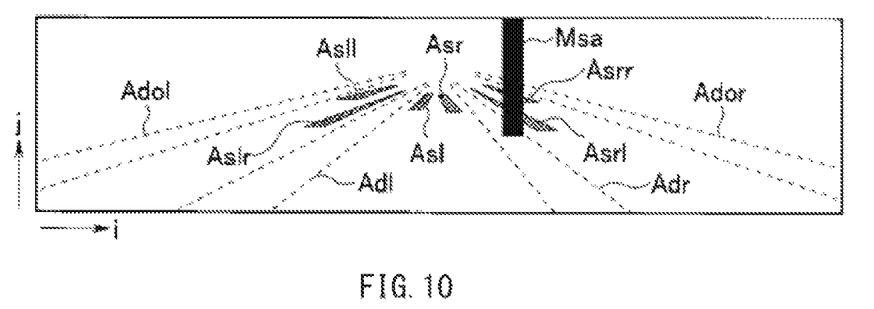
FIG. 10 is an explanatory diagram illustrating a mode of setting a region in the similar-luminance image found in FIG. 9 to a lane-line-search prohibition region.
Figure 11:
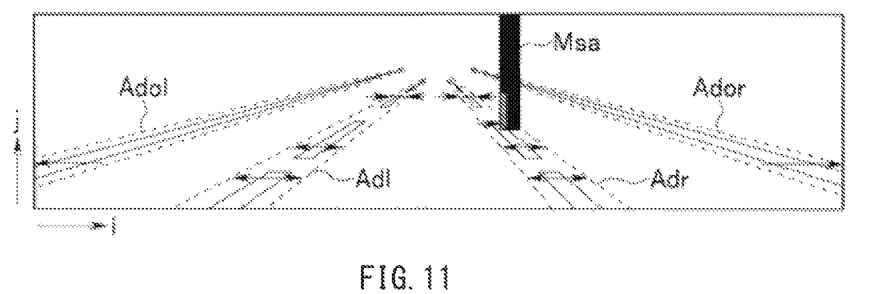
FIG. 11 is an explanatory diagram illustrating a mode of detecting a start point and an end point of the lane line in the lane-line search region.

In step S9, the front traveling environment recognition section 13 performs a mask process including, but not limited to, setting a mask region Msa corresponding to the luminance image in which the light streak Sa is detected and converting a pixel of the mask region Msa into a black pixel (see FIG. 10). Thereafter, the process may be caused to proceed to step S10. As a result, the lane-line search region Ad masked by the mask process may be prohibited from the lane line search. The process in step S9 may correspond to a process performed by the "mask processing section" of one embodiment of the technology.

The front traveling environment recognition section 13 may cause the process to proceed to step S10 from step S6 or S9, and may search the lane-line search region Ad for the start point and the end point of the edge indicating the lane line L. The search of the lane line L may be performed by, as indicated by arrows in FIG. 11, determining the luminance variation from the bottom to the top for each search line for a plurality of search lines extending in the horizontal direction in the lane-line search region Ad. At this time, in a case where a pixel masked by mask region Msa is detected on the lane-line search region Ad of the search line, the front traveling environment recognition section 13 may terminate search of the search line subsequent to the pixel, and may proceed to the next upper row to perform search on the search line.

Figure 14A:
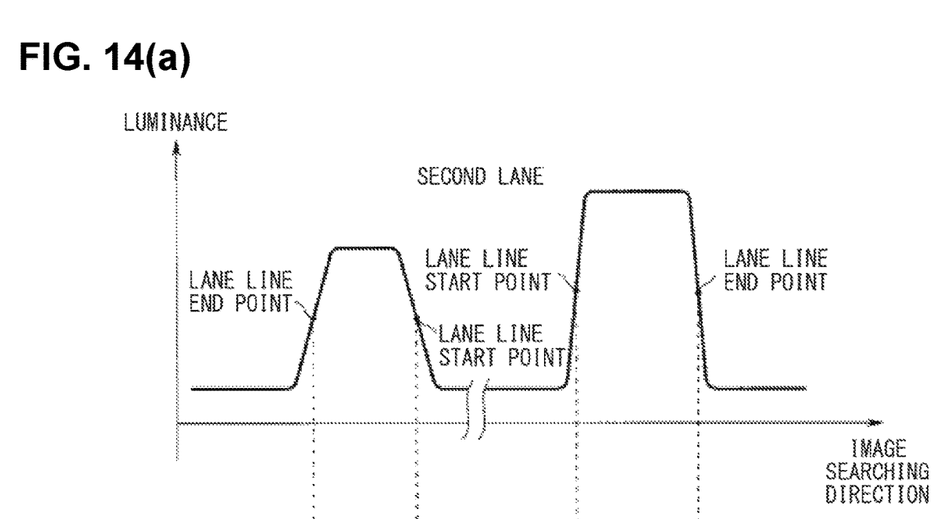
FIG. 14(a) illustrates distribution of luminance in an image searching direction.
Figure 14B:
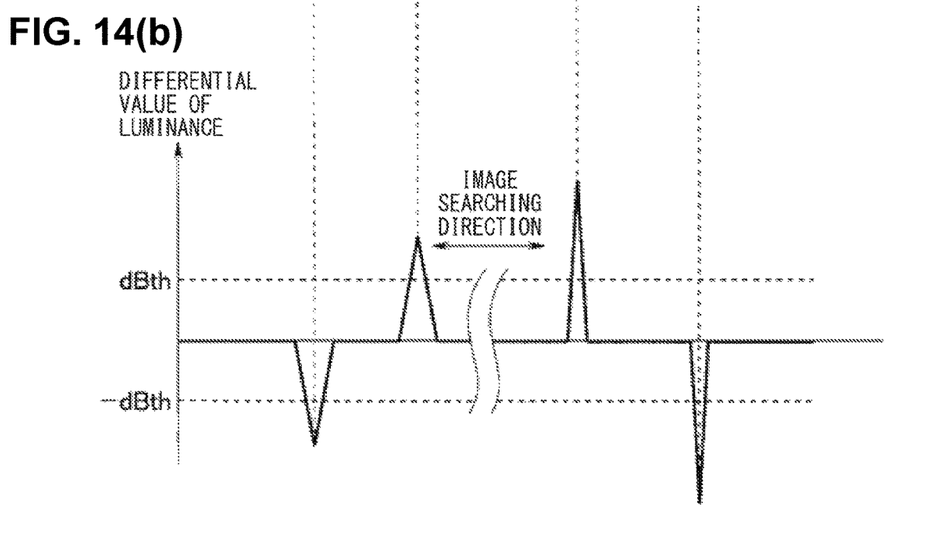
FIG. 14(b) illustrates a relationship between the distribution of luminance illustrated in FIG. 14(a) and a differential value of the luminance.

Various methods of searching for the start point and the end point of the lane line L are known. One example is illustrated in (a) and (b) of FIG. 14. In the drawing, the image is searched outward in a horizontal search line with the lane along which the own vehicle M is traveling, i.e., the second lane, being set as the center. Extracted as the lane line start point is an edge point in which the luminance of the pixel inside the lane along which the own vehicle M is traveling, i.e., the second lane, is relatively low with respect to the luminance of a pixel outside the second lane, and in which a differential value of the luminance indicating the amount of variation is greater than or equal to a set threshold (dBth) on the positive side. Extracted as the lane line end point is an edge point in which the luminance of the pixel inside the second lane is relatively high with respect to the luminance of a pixel outside the second lane, and in which the differential value of the luminance indicating the amount of variation is less than or equal to a set threshold (−dBth) on the negative side.

In step S11, the front traveling environment recognition section 13 may plot the lane line start point and the lane line end point on the image as lane-line candidate points, may determine an approximate line representing the edge (i.e., boundary) of each lane line on the basis of a string of lane-line candidate points continuing from the bottom to the top of the image, may generate a lane line of the current frame on the basis of the approximate line, and may cause the process to exit the routine. The method of determining the approximate line of the edge of the lane line on the basis of the lane-line candidate points and the method of generating the lane line on the basis of the approximate line are known, and therefore descriptions thereof are omitted here.

Figure 12:
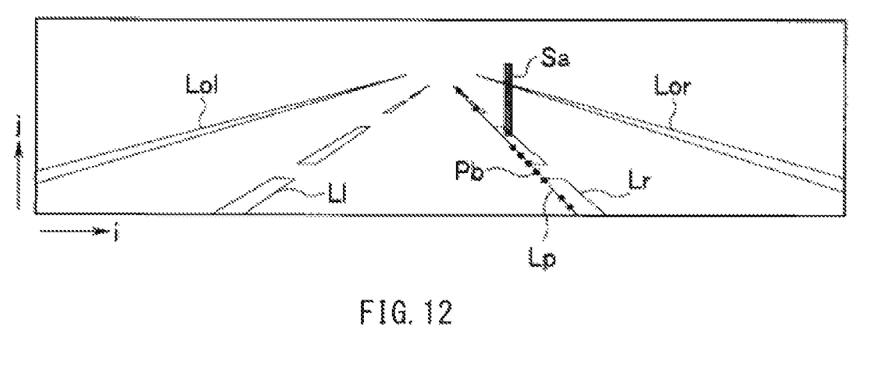
FIG. 12 is an explanatory diagram illustrating a state in which a normal lane line is detected.

FIG. 12 illustrates a mode in which lane-line candidate points Pb are plotted on an inner side of the right lane line of the second lane along which the own vehicle M travels, and an approximate line Lp is set on the inner edge on the basis of a string of the lane-line candidate points Pb. At this time, even if the light streak Sa is consecutive to the lane-line candidate points Pb, the region of the light streak Sa may be masked during the search and the search may be prohibited. Thus, the light streak Sa may be prevented from being erroneously recognized as the lane line start point or the lane line end point. As a result, it is possible to appropriately detect the lane-line candidate point Pb on the basis of lane line start point or the lane line end point.

The steering control unit 3 may execute control related to various types of steering such as known ALK control or LDP control on the basis of the lane line generated by the front traveling environment recognition section 13.

Thus, according to the example embodiment, the light-streak search region As is set for each frame image. Upon recognizing the lane line, first, the light-streak search region As is set to search for the edge having luminance variation and crossing, in the vertical direction, the light-streak search region As. Thereafter, the edge is set as the light-streak candidate point Ps, and whether the image having the luminance whose level is similar to the level of luminance of the region between the light-streak candidate points Ps reaches the lane-line search region Ad is determined. If the image having the luminance whose level is similar to the level of luminance of the region between the light-streak candidate points Ps reaches the lane-line search region Ad, the image is subjected to the mask process and the lane line search is prohibited. Performing the mask process makes it possible to eliminate in advance the light streak Sa, even in the case where the light streak Sa appears in the image captured by the camera section 11. As a result, it is possible to appropriately generate the lane line along the actually existing lane line.

The technology is not limited to the example embodiments described above, and, for example, the light streak Sa may include not only the light that enters from road surface R but may also include, for example, light that directly enters from a streetlamp.

According to at least one embodiment of the technology, a light-streak search region is set adjacently to a lane-line search region. The lane-line search region is a region in which a lane line is searched for, and is set on an image of a traveling environment captured by an imaging device. The light-streak search region is a region in which a light streak that appears in the image is searched for. Whether the light streak that crosses, in a vertical direction, the light-streak search region is found is determined. If the light streak that crosses, in the vertical direction, the light-streak search region is determined as being found, whether the light streak reaches the lane-line search region is determined. If the light streak is determined as reaching the lane-line search region, a mask process is performed on the light streak. This makes it possible to appropriately generate a lane line by eliminating the light streak even in the case where the light streak appears in the image.

The front traveling environment recognition section 13 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the front traveling environment recognition section 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the front traveling environment recognition section 13.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A lane line recognition apparatus comprising:
   an imaging device to be mounted on a vehicle and configured to capture an image of a traveling environment in front of the vehicle;
   a lane-line-search-region setting section configured to set a lane-line search region on the image captured by the imaging device, the lane-line search region being a region in which, on a basis of a lane line defining a lane and found on a basis of an image of a last frame, a lane line of a current frame is to be searched for;
   a light-streak-search-region setting section configured to set a light-streak search region adjacently to the lane-line search region, the light-streak search region being a region in which a light streak that appears in the image captured by the imaging device is to be searched for;
   a light-streak determination section configured to determine whether a light streak that crosses, in a vertical direction of the image, the light-streak search region set by the light-streak-search-region setting section is found;
   a light-streak-reaching determination section configured to determine, in a case where the light-streak determination section determines that the light streak that crosses, in the vertical direction, the light-streak search region is found, whether the light streak that crosses the light-streak search section reaches the lane-line search region set by the lane-line-search-region setting section; and
   a mask processing section configured to perform, in a case where the light-streak-reaching determination section determines that the light streak that crosses the light-streak search section reaches the lane-line search region, a mask process on the light streak that crosses the light-streak search section in a process of recognizing the lane line of the current frame on a basis of luminance variation in the lane-line search region set by the lane-line-search-region setting section.

2. The lane line recognition apparatus according to claim 1, wherein, in a case where the mask processing section performs the mask process of masking the light streak that crosses the light-streak search section, search for the lane line of the current frame in a region on which the mask process is performed is prohibited.

3. The lane line recognition apparatus according to claim 2, wherein the light-streak determination section is configured to determine whether the light streak that crosses the light-streak search section is found by determining luminance variation for each of one or more search lines in the light-streak search region set by the light-streak-search-region setting section.

4. The lane line recognition apparatus according to claim 3, wherein, in a case where the light-streak determination section determines that the light streak that crosses the light-streak search section is found, the light-streak-reaching determination section is configured to search, inside and outside the light-streak search region set by the light-streak-search-region setting section, for the light streak that crosses the light-streak search section in a downward direction of the image.

5. The lane line recognition apparatus according to claim 2, wherein, in a case where the light-streak determination section determines that the light streak that crosses the light-streak search section is found, the light-streak-reaching determination section is configured to search, inside and outside the light-streak search region set by the light-streak-search-region setting section, for the light streak that crosses the light-streak search section in a downward direction of the image.

6. The lane line recognition apparatus according to claim 1, wherein the light-streak determination section is configured to determine whether the light streak that crosses the light-streak search section is found by determining luminance variation for each of one or more search lines in the light-streak search region set by the light-streak-search-region setting section.

7. The lane line recognition apparatus according to claim 6, wherein, in a case where the light-streak determination section determines that the light streak that crosses the light-streak search section is found, the light-streak-reaching determination section is configured to search, inside and outside the light-streak search region set by the light-streak-search-region setting section, for the light streak that crosses the light-streak search section in a downward direction of the image.

8. The lane line recognition apparatus according to claim 1, wherein, in a case where the light-streak determination section determines that the light streak that crosses the light-streak search section is found, the light-streak-reaching determination section is configured to search, inside and outside the light-streak search region set by the light-streaksearch-region setting section, for the light streak that crosses the light-streak search section in a downward direction of the image.

9. A lane line recognition apparatus comprising: an image sensor to be mounted on a vehicle and configured to capture an image of a traveling environment in front of the vehicle; and
circuitry configured to
set a lane-line search region on the image captured by the image sensor, the lane-line search region being a region in which, on a basis of a lane line defining a lane and found on a basis of an image of a last frame, a lane line of a current frame is to be searched for,
set a light-streak search region adjacently to the lane-line search region, the light-streak search region being a region in which a light streak that appears in the image captured by the image sensor is to be searched for,
determine whether a light streak that crosses, in a vertical direction of the image, the set light-streak search region is found,
determine, in a case where the light streak that crosses, in the vertical direction, the light-streak search region is determined as being found, whether the light streak that crosses the light-streak search section reaches the set lane-line search region, and
perform, in a case where the light streak that crosses the light-streak search section is determined as reaching the lane-line search region, a mask process on the light streak that crosses the light-streak search section in a process of recognizing the lane line of the current frame on a basis of luminance variation in the set lane-line search region.

* * * * *